Sept. 15, 1931.  R. E. MARBURY  1,823,328

SELF CLEARING FUSED SECTIONALIZED CAPACITOR

Filed May 27, 1929

INVENTOR
Ralph E. Marbury.
BY
ATTORNEY

Patented Sept. 15, 1931

1,823,328

UNITED STATES PATENT OFFICE

RALPH E. MARBURY, OF EDGEWOOD, PENNSYLVANIA, ASSIGNOR TO WESTINGHOUSE ELECTRIC & MANUFACTURING COMPANY, A CORPORATION OF PENNSYLVANIA

SELF-CLEARING FUSED SECTIONALIZED CAPACITOR

Application filed May 27, 1929. Serial No. 366,471.

My present invention relates to a new departure in the design of static condensers or capacitors for power-factor correction on commercial power lines.

The main object of my invention is to provide a capacitor which will never fail as a unit but will merely shrink in capacity as time goes on.

Another object of my invention is to provide a capacitor unit in which the short-circuit current is limited to a value which can be readily interrupted by a fuse, without unduly increasing the total losses or the total cost per KVA of condenser rating.

With the foregoing and other objects in view, my invention consists in the designs and combinations hereinafter described and explained and pointed out in the appended claims, with reference to the accompanying drawings, wherein

Figure 1:
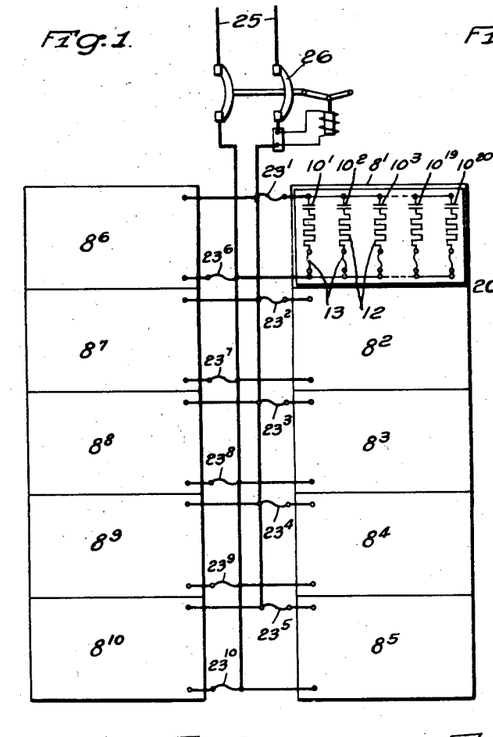
Fig. 1 is a diagrammatic view of circuits and apparatus embodying my invention.

According to my invention, as shown diagrammatically in Fig. 1, I provide a capacitor unit or tank $8^1$ of a convenient size, such as a 10 KVA or other size, each unit being composed of a large number of small capacitor sections $10^1$ to $10^{20}$. Thus, a single tank may have 20 or 40 sections, more or less, as will be later described.

Figure 2:
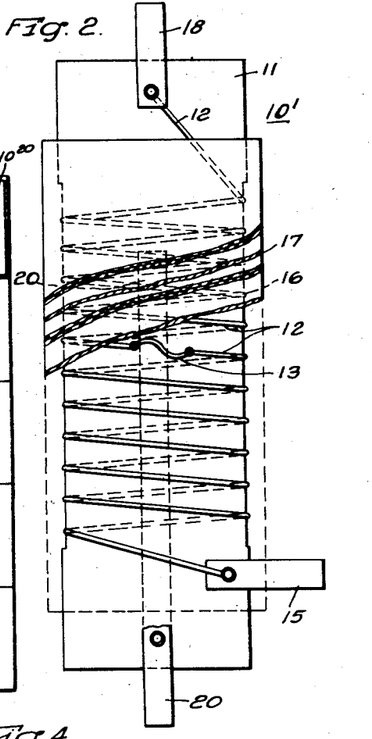
Fig. 2, is a plan view of one of the capacitor sections, parts being broken away to show the construction.

As shown in Fig. 2, each section, as $10^1$, is wound on a separate fish paper mandrel 11 and is provided with a current-limiting device comprising a resistor 12, and preferably, also an individual fuse 13. The resistor 12 may be in the form of a fine wire which is wound on the mandrel 11 before the condenser foil and dielectric are applied. Preferably, also, the fuse 13 is placed in good thermal relation to the resistor 12, being fastened to the paper mandrel by means of paper clips, either at the end of the resistor wire 12 or in the center of it, as shown in Fig. 2. In this way, the heating of the resistor wire by the short-circuit current, in case of a fault, assists materially in bringing the fuse to the temperature necessary for interruption of the current.

After an insulating wrapping has been placed over the resistor wire and fuse, the foil and paper constituting the condenser section is wrapped on, in the usual way. It will be noted that the bottom end of the resistor wire is clipped to a narrow strip of foil 15 which is wrapped around in contact with one of the layers 16 of the two condenser foils 16 and 17, when the condenser is wound upon the mandrel to make contact with said foil 16.

The upper terminal of the resistor wire 12 is clipped to an upwardly projecting lead 18 at the top of the mandrel. After about one half of the capacitor section has been wound, a downwardly projecting strip 20 of foil is laid in, in contact with the other layer 17 of the two capacitor foils, in order to provide the other terminal for the condenser section.

The sections 10, with their individual fuses 13 and resistors 12, are all connected together in parallel inside the tank, either in a single-phase connection or in a polyphase connection, as desired.

In general, when I refer to a condenser or capacitor section, I mean one of the separate parallel paths into which the capacitor unit is subdivided. I have found that there is an optimum voltage for which to wind the individual elements of the capacitor. With the present available materials; that is, with the best possible choice of thickness and grade, and the number of sheets, of paper to be used as dielectric, it is advantageous to wind the individual elements of the capacitor for a voltage in the neighborhood of 800 or 900 volts, any voltage higher than that being obtained by connecting a plurality of such elements in series. These serially-connected elements will hereafter be treated as if they were a single section constituting one of the parallel paths of the capacitor unit. For voltages below 800 or 900 volts, it is necessary, of course, to change the dielectric from this optimum condition, resulting in a somewhat higher cost per KVA, in order to manufacture the capacitors.

The assembled group of sections 10, with their individual fuses and resistors, after being tested in the usual way to cull out defects, are assembled, as shown in Fig. 1, or in any other suitable manner, in a tank $8^1$, and impregnated and filled with oil or other impregnating material.

If desired, also, each tank or unit, as $8^1$, may be protected by an external fuse $23^1$.

Ordinarily, a large number of tanks or units $8^1$ to $8^{10}$, with their external fuses $23^1$ to $23^{10}$, if such external fuses are used, are mounted in a single bank. Fig. 1 shows a small installation of 100 KVA capacity, or ten 10 KVA units, $8^1$ to $8^{10}$. This bank of capacitors is connected to a line 25 through a circuit breaker 26.

One of the most distinctive features of static condensers or capacitors for power-factor connection on commercial lines, as they were made prior to my present invention, has been their high short-circuit-current capacity and their high efficiency or low losses. Their short-circuit current has been so large that these prior-art capacitors have been used for percussive welding, by connecting a capacitor momentarily to a direct-current line, thereby storing energy therein, and subsequently short-circuiting it through the joint to be welded.

Heretofore, most manufacturers have succeeded in keeping the capacitor losses down to 6 watts per KVA, and most customers have come to demand that the capacitors have no more than the loss just mentioned, although I have, in some cases, by a judicious choice of paper and proper methods of treatment, produced capacitors having a loss as low as 3 watts per KVA, and it is reasonable to believe that this figure will be even further reduced by future improvements.

The high short-circuit current of a capacitor unit is a very distinct disadvantage, when it is used for power-factor correction, because it necessitates the employment of very costly and unreliable high-duty fuses and breakers. I am not referring, however, to a single capacitor unit which may be used, for example, to correct the power factor of an induction motor, at the end of a long 220-volt feeder-line within a factory, where the resistance of the feeder-line, itself, is sufficient to limit the maximum current which can be obtained on a dead short-circuit on the line, and where the amount of energy stored in the single capacitor unit is not sufficient to overtax a fuse or circuit breaker of convenient size.

An altogether different problem is presented when capacitors are used, in large banks, for power-factor correction. Such banks are never smaller than 60 KVA capacity and they often run into thousands of KVA capacity. The short-circuit energy of such a large bank of capacitors is something tremendous and it has heretofore presented a serious problem in the design of such installations.

The need is very strongly indicated for a capacitor unit which will not fail.

Figure 3:
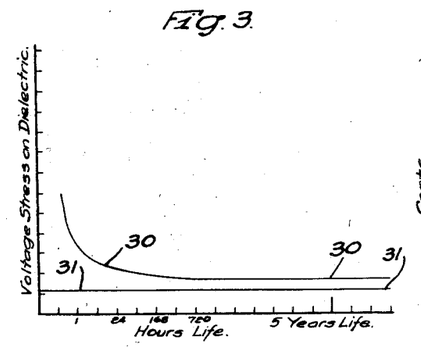
Figs. 3 and 4 are curve diagrams to be hereinafter described.

To this end, capacitors have heretofore been designed as indicated by the curves in Fig. 3. This figure shows a typical life curve 30, showing the relation between the working stress on the dielectric and the life of the condenser. It will be noted that, as the working stress is reduced, the life of the capacitor increases as indicated by a very steep curve. It will also be observed that the curve 30 shown in Fig. 3 is merely an average or representative curve, and that some capacitors will fail sooner than is indicated by the curve, and others will last much longer than is indicated.

In an installation, therefore, where no faults are to be permitted, it has been necessary to operate the capacitors at a voltage stress which is considerably below the maximum stress which the material will stand. The straight horizontal line 31 in Fig. 3, shows the relation of the accepted working stress, or such stress as was normally used previous to my present invention, to the stress which most tests indicate could be used, as indicated by curve 30, if it were not so vitally necessary to exclude the possibility of a fault.

This actual working stress, heretofore used, is approximately 30% below the stress which would apparently give an average life of 5 to 10 years. This margin has been necessary heretofore because there are always a few capacitors, out of large numbers, which will not last as long as the curve 30 would indicate, and also because a failure of a capacitor unit is a very serious matter, since it might trip off the circuit breaker and thus take the entire bank of capacitors out of service for a period of time, and, in case of individual external fuses 23, these fuses might blow or the capacitor unit itself might blow, thus damaging adjacent capacitor units, and, in any case, a failure would result in the loss of a complete unit which might be worth $75.00 or $100.00.

It is thus evident that the design of capacitor units and large capacitor installations has been very seriously handicapped by the large short-circuit currents which have been produced.

The use of a resistor in series with the entire bank of capacitors, in order to limit the duty imposed upon the circuit breaker, would involve utterly prohibitive losses. One manufacturer has resorted to the expedient of placing an external resistor in series with each 5-KVA unit of a large condenser bank, on a 500 volt line, and, even though his resistor only limited the short-circuit to 5000 amperes, involving a very expensive and unreliable fuse, each resistor, because of the enormous short-circuit current which it had to be able to carry during the two cycles required to blow the fuse, had to be very bulky, involving a pound of resistor material at a cost of about $8.00, to which must be added about $3.00 more for the heavy-duty external fuse, as compared to a cost of about $40.00 for the 5-KVA unit alone. For this cost, it would almost have been worth while to put in a separate breaker for each 5-KVA unit. It is obvious that the relief provided by the expedient of external resistors and fuses, inadequate as it was, was nevertheless too costly to be of general application.

Furthermore, it is not feasible to build capacitors of this type in units of less than 5 KVA each, because of the very considerable expense of the terminal bushings and the tanks themselves. In fact, I propose to standardize on a 10-KVA unit, and even larger units may be utilized in the near future.

According to my invention, I provide, for the first time, a capacitor unit which will never fail as a unit but will merely shrink in capacity, as individual sections become open-circuited from time to time. I provide also a capacitor unit which does not have the high short-circuit-current property which has always characterized the capacitors of this type heretofore, and I achieve this low short-circuit property in a unit of commercially practicable size, such as 5 or 10 KVA, in which the total losses in the capacitor sections and in the internal resistance need not exceed 6 watts per KVA of the capacitor rating.

Furthermore, my invention opens up a wide field for the reduction in the cost of capacitors, as will now be explained in connection with Figs. 3 and 4.

Figure 4:
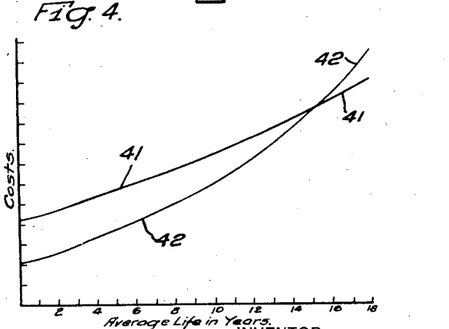

In Fig. 4, the curve 41 shows the first cost, and the cumulative yearly charges to cover interest and maintenance, for a capacitor working at the voltage-stress heretofore common, as shown by the horizontal line in Fig. 3. At this voltage stress, the expected life is probably more than 200 years, or an average failure of about one-half of 1% of the total capacity each year. This curve 41 shows a high first cost and, consequently, cumulative interest charge, although it involves only a small maintenance cost, even assuming, as we must, that the entire unit is to be replaced for each failure, which was the case prior to my invention.

In Fig. 4, the curve 42 shows a similar curve for a capacitor installation working at a voltage stress somewhat more than 40% higher, whereby a reduction of about 50% is made in the first cost, thereby reducing the interest charges compounded at 6% annually, but increasing the maintenance charges for the replacement of units, which now fail at an average rate of about 9% per year. It will be noted that, during the first fifteen years of the life of the condenser installation, the conditions depicted by the second curve 42 would prove the more economical. However, the conditions depicted in the second curve 42 could not be tolerated, heretofore, because of the large number of faults which would occur each year, and because of the serious consequences of each fault, on account of the damage resulting from the extremely high short-circuit currents involved.

By my present invention, both curves 41 and 42 of Fig. 4 will be considerably modified, the second curve much more than the first curve, because of my units, instead of failing each time a fault occurs, will merely shrink by 1 KVA, or a fraction of a KVA, depending upon the degree of sectionalization. Hence, the units will not require replacement at all, until a material shrinkage in the total KVA capacity has occurred, at which time new units may simply be added without taking out any of the old ones. Moreover, the relatively high rate of occurrence of faults, which is encountered with the conditions depicted in the second curve 42, is nothing at all to be feared, with my new design, because nothing can possibly happen, with each fault, except a slight and inconsequential shrinkage in the total capacity of the installation.

My invention, therefore, makes it possible to enormously reduce the first cost and maintenance charges on a capacitor installation, besides removing the dangers and the need for costly heavy-duty protective equipment involved in all previous capacitor installations which were used for power-factor correction. Moreover, these advantageous results are obtained without large additional losses in the internal resistors which are added, and, in fact, the additional resistor losses involved in my invention may be made as small as may be necessary or expedient, being limited only by the slightly increased cost involved in the use of a very high degree of sectionalization.

While the broad principles of my invention are outlined above and are not limited to any particular quantities or proportions, and while the statement of figures involving any definite limits of design, according to my invention, is somewhat difficult, owing to the fact that every engineering design is a compromise of more or less antagonistic requirements, I shall attempt, in the following paragraphs, to give some indication of quantities, to the best of my knowledge at the present time.

According to circuit-breaker engineers, the current which a given fuse or circuit breaker will interrupt varies inversely with the voltage, or, in other words, the watts or volt amperes which a fuse can interrupt is a constant value, independent of the voltage. Furthermore, the amount of energy which is stored in the current-limiting resistor, during the time necessary for the fuse to open, after the occurrence of a short circuit, is inversely proportional to the voltage at any given short-circuit current or is directly proportional to the short-circuit current, at any given voltage. Considering the necessity, therefore, for a limited amount of energy to be absorbed by the resistor during the two cycles during which the short-circuit current may be expected to flow, and also considering the fact that the disposition of the resistor inside of the defective section, where it cannot damage good sections by its overheating, makes possible the use of inexpensive designs for the resistor, and also considering the cost and performance of the less expensive fuses now available, I should place the upper limit of the watts or volt-amperes to be handled by the fuses on short circuit to be $$W_s = 1{,}000{,}000, \quad (1)$$

or smaller values for more conservative designs.

Considering the fact that a larger number of sections is required at lower voltages because of the larger area of dielectric, and hence, greater chance of failure than at higher voltages, making the short-circuit currents less for a given percentage of power loss in the resistors, and also considering the fact that the use of a larger number of fuses in the lower-voltage units necessitates a cheaper fuse, it is usually desirable to use relatively lower short-circuit currents in the lower-voltage ratings, giving $$W_s = 20{,}000 \; E^{\frac{1}{2}} \quad (2)$$

or $$W_s = 13{,}000 \; E^{\frac{1}{2}} \quad (3)$$

or even $$W_s = 10{,}000 \; E^{\frac{1}{2}} \quad (4)$$

where E is the rated voltage.

Above 800 or 900 volts, where it is frequently desirable simply to add condenser sections in series, in order to get higher voltages, rather than using a different dielectric, it may be desirable to fix a given limit, such as that expressed in Equation (1), or even a much lower limit for a more conservative design, such as $$W_s = 350{,}000; \quad (5)$$

whereas, below 800 or 900 volts, where the number and quality of the paper layers must be changed with the voltage, it may be desirable to reduce the short-circuit watts or volt-amperes in accordance with some power of the voltage, as indicated, for example, in Equation (3).

The maximum loss which can be tolerated in the resistors is also a matter of engineering compromise. A maximum value of 3 watts per KVA of the capacitor rating or 0.3%, is a desirable limit to set for the resistor-loss, although, in view of the greater ease in obtaining a low resistor-loss in the lower-voltage ratings, because of the large number of sections, a sliding scale, such as .033 $E^{\frac{1}{2}}$%, may be adopted for the maximum resistor-loss that will be tolerated in any design or rating. Greater or less losses may be used for less or more conservative designs of capacitors, as indicated in the appended claims.

A certain minimum number of sections, or parallel paths, for a 10 KVA capacitor-unit, is also found to be desirable, not only from the standpoint of limiting the short-circuit current and the resistor losses, but also from the standpoint of limiting the number of probable failures. This last-mentioned item, the number of probable failures, increases with the total area of the paper dielectric, or faster than the inverse square of the voltage, and hence is very large in low-voltage condensers having a very large quantity of paper. It is because of the certainty that a certain number of failures may be expected for every million square inches of paper that it is necessary to highly-sectionalize a low-voltage condenser in order to limit the quantity of paper that is rendered useless by each failure.

Taking all things into consideration, the minimum number of sections or parallel paths N in a 10 KVA condenser, may be expressed by any one of the following empirical formulas, according to the other conditions of the design:

$$N > 400 \; E^{-\frac{1}{2}} \quad (6)$$

$$N > 5, 13 \text{ or } 24, \text{ according to the design}, \quad (7)$$

$$N > 1500 \; E^{-\frac{3}{4}}, \quad (8)$$

$$N > 1000 \; E^{-\frac{3}{4}}, \quad (9)$$

or $$N > 800 \; E^{-\frac{3}{4}}. \quad (10)$$

The maximum number of sections per KVA, or per 10 KVA, the minimum short-circuit current, and the minimum resistance-loss are quantities which cannot so easily be fixed. They are determined by offseting the expense of additional subdivision or sectionalization, against the advantages to be secured thereby. The capacitor loss in the best capacitor now made for commercial power lines is something like 3 watts per KVA, or 0.3%, so that the resistor loss becomes relatively inconsequential, and hence, is one that necessitates no further reduction, so far as losses are concerned, when it is as low as one fifth or one tenth of the capacitor loss, more or less, according to the requirements of the design. In general, I should say that it is not necessary or desirable to have more than 2000 $E^{-0.4}$ parallel paths in a 10-KVA unit, or to reduce the short-circuit current to less than 800 $E^{-0.6}$ amperes, although I do not desire to be altogether limited to these values.

In the subjoined table is illustrated the effect of sectionalizing the capacitor unit, showing the calculations for one section, 25 sections, 40 sections, 80 sections and 200 sections:

| Unit capacity in KVA | Total current in amperes | Volts | Ohms in each resistor | Short-circuit amperes | No. of sections and resistors | Capacitor loss in watts | Resistor loss in watts | Total loss in watts |
|---|---|---|---|---|---|---|---|---|
| 10 | 23 | 440 | 4.4 | 100 | 1 | 30 | 2,330 | 2,360 |
| " | " | " | " | " | 25 | " | 93 | 123 |
| " | " | " | " | " | 40 | " | 58 | 88 |
| " | " | " | " | " | 80 | " | 29 | 59 |
| " | " | " | " | " | 200 | " | 12 | 42 |

I prefer to omit entirely the external fuses $23^1$ to $23^{10}$ although, in some cases, such fuses may be desirable, as an extra precaution, to operate in case some internal fuse should fail to clear a fault. It is quite possible, also, that such external fuses, even though they are not necessary, may be demanded by many customers from force of habit.

By my invention, I build a capacitor unit which will never fail all at once but will gradually shrink in capacity, with time, as individual sections may blow out from time to time. This shrinkage of capacity may be made fast or slow, according to the voltage-stress imposed upon the dielectric material in the original design of the capacitor, it being understood that the cheaper capacitors will have the higher rate of shrinkage. Thus, I can supply a 10 KVA capacitor which may be sold with a guarantee that, by the end of ten years, it shall have, say, at least 9 KVA capacity, and so on. When the customer finds that the entire capacity of his capacitor bank has shrunk to too small a value, he may simply add more units, or he may take out the units having the lowest KVA and replace them by new units, leaving the rest in service. I consider this a very important step in advance, in the capacitor art, which is in sharp contrast to the prior practices of supplying a capacitor bank composed of units each of which will fail suddenly as a unit, as distinguished from merely gradually shrinking in KVA capacity, with the passage of time, as in my capacitors.

While I have illustrated my invention in connection with a capacitor for power-factor correction on a commercial power line of, say, 60 cycles, it is obvious that I am not limited to such service or to such frequency. Moreover, the losses which would be tolerated in a power-factor correction application might not be tolerated in some other uses or capacitors, and I do not care to be limited to any particular rate of losses or relation between the resistance-loss and the capacitor-loss which, as pointed out above, may be made anything that is required. Neither am I limited to any particular voltage of capacitors, as my invention may be applied to low-voltage apparatus, such as 110- or 550-volt capacitors, and it may also be applied to high-voltage apparatus, such as 2300- or 5000-volt capacitors.

In the foregoing description, as well as in the subjoined claims, when I speak of individual resistors and fuses, I wish such terminology to be understood as including either a single element or any combination of elements for performing the functions of individual resistors and fuses.

I claim as my invention:

1. A capacitor unit having a plurality of parallel sections in a single impregnating tank having two terminals, said parallel sections being connected between said two terminals, and said tank being substantially filled with insulating impregnating material, characterized by having individual fuses and resistors within the tank, at least in part immersed in said impregnating material and connected in series with the respective sections, said individual fuses and resistors being of such nature that a fault in any section is certainly cleared by its fuse, even when said unit is connected to a line of relatively very large short-circuit capacity, whereby the capacitor never fails as a unit, but merely shrinks in capacity as time goes on.

2. A capacitor having a plurality of parallel-connected sections and an individual limiting device in series-circuit relation to each section before it is connected in parallel connection, each of said individual limiting devices being of sufficiently high resistance to limit the short-circuit current therein to less than a thousand amperes, the kilowatt capacity of each limiting device being correspondingly small, and the number of sections and limiting devices being sufficiently large to keep the resistance-loss in all of said limiting devices less than the capacitor-loss.

3. The invention, as specified in claim 2, characterized by the fact that said individual limiting devices include fusible means for open-circuiting said sections in case of a short-circuit.

4. The invention, as specified in claim 2, characterized by the fact that said large number of parallel-connected sections and individual limiting devices are all in a single tank substantially filled with insulating impregnating material.

5. The invention, as specified in claim 2, characterized by the fact that said large number of parallel connected sections and individual limiting devices are all in a single tank substantially filled with insulating impregnating material and by the further fact that said individual limiting devices include fusible means for open-circuiting said sections in case of a short-circuit.

6. A capacitor unit having at least twenty-five parallel sections in a single non-separable unit, with individual resistors for the sections, said resistors being of such resistance that a fault in any section results in a short-circuit current no greater than can be certainly cleared by a low-capacity fuse, even when said unit is connected to a line of relatively very large short-circuit capacity.

7. A capacitor unit having at least twenty-five parallel sections in a single non-separable unit having individual fuses and resistors for the sections of such nature that a fault in any section is certainly cleared by its fuse, even when said unit is connected to a line of relatively very large short-circuit capacity, whereby the capacitor never fails as a unit but merely shrinks in capacity as time goes on.

8. A capacitor unit having at least fifteen sections in a plurality of parallel circuits in a single impregnating tank substantially filled with insulating impregnating material characterized by having, in each of said parallel circuits, an individual resistor of such resistance that a fault in any section results in a short-circuit current no greater than can be cleared by a low-capacity fuse, even when said unit is connected to a system of relatively very large short-circuit capacity.

9. A capacitor unit having at least fifteen sections in a plurality of parallel circuits in a single impregnating tank substantially filled with insulating impregnating material characterized by having, in series with each of said parallel circuits, an individual fuse and resistor of such nature that a fault in any section is certainly cleared by its fuse, even when said unit is connected to a line of relatively very large short-circuit capacity, whereby the capacitor never fails as a unit but merely shrinks in capacity as time goes on.

10. A capacitor unit having at least twenty-five parallel sections in a single non-separable unit, with individual resistors for the sections, said resistors being of such resistance that a fault in any section results in a short-circuit current no greater than can be certainly cleared by a low-capacity fuse, even when said unit is connected to a line of relatively very large short-circuit capacity, characterized by the fact that each section comprises a mandrel, a resistor adjacent its surface and the condenser-section material wound over said resistor on said mandrel.

11. A capacitor unit having at least fifteen sections in a plurality of parallel circuits in a single impregnating tank substantially filled with insulating impregnating material characterized by having, in each of said parallel circuits, an individual resistor of such resistance that a fault in any section results in a short-circuit current no greater than can be cleared by a low-capacity fuse, even when said unit is connected to a system of relatively very large short-circuit capacity, further characterized by the fact that each section comprises a mandrel, a resistor adjacent to its surface and the condenser-section material wound over said resistor on said mandrel.

12. A capacitor unit having a plurality of sections in a single impregnating tank substantially filled with insulating impregnating material and having an individual internal resistor in series with each section of such resistance that the short-circuit current in any section, in case of a fault, does not exceed several hundred amperes, even when said unit is connected to a line of relatively large short-circuit capacity, the number of sections and resistors in parallel in said unit being so large that the total resistor-loss does not exceed several times the capacitor loss.

13. A capacitor unit comprising a tank containing impregnating material and a plurality of parallel paths, each path comprising one or more capacitor sections having one or more serially connected resistors disposed in juxtaposition to the capacitor material of said path.

14. A capacitor unit comprising a tank containing impregnating material and a plurality of parallel paths, each path comprising one or more capacitor sections having one or more serially-connected resistors disposed in juxtaposition to the corresponding capacitor material and substantially surrounded thereby.

15. A capacitor unit comprising a tank containing impregnating material and a plurality of parallel paths, each path comprising one or more capacitor sections having one or more serially connected resistors and fuses disposed in juxtaposition to the corresponding capacitor material and substantially surrounded thereby.

16. A capacitor unit comprising a tank containing impregnating material and a plurality of parallel paths, each path comprising one or more capacitor sections having one or more serially connected resistors and fuses, each of said fuses being in good thermal relation to one or more of said resistors and in juxtaposition to the serially connected capacitor section or sections underneath said impregnating material, whereby the heating of the resistor or resistors, under short-circuit conditions, will assist in raising the fuse to disrupting temperature but will not damage other parallel paths which contain no faults.

17. A capacitor unit having a plurality of parallel sections in a single impregnating tank substantially filled with insulating impregnating material, characterized by having individual fuses and resistors for the sections of such nature that a fault in any section is certainly cleared by its fuse, even when said unit is connected to a line of relatively very large short-circuit capacity, whereby the capacitor never fails as a unit, but merely shrinks in capacity as time goes on, further characterized by the fact that each section comprises a mandrel, a resistor adjacent to its surface and the condenser-section material wound over said resistor on said mandrel.

18. A capacitor unit having a plurality of parallel sections in a single impregnating tank substantially filled with insulating impregnating material, characterized by having individual fuses and resistors for the sections of such nature that a fault in any section is certainly cleared by its fuse, even when said unit is connected to a line of relatively very large short-circuit capacity, whereby the capacitor never fails as a unit, but merely shrinks in capacity as time goes on, further characterized by the fact that each section comprises a mandrel, a resistor adjacent to its surface, a fuse in good thermal relation to said resistor and the condenser-section material wound over said resistor and fuse on said mandrel.

19. A capacitor unit comprising a plurality of sections in a single non-separable unit, each section comprising a mandrel having a capacitor and a resistor thereon.

20. A capacitor unit comprising a plurality of sections in a single non-separable unit, each section comprising a mandrel having a capacitor and a resistor wound therein and an individual fuse mounted on each mandrel.

21. A capacitor unit comprising a single impregnated capacitor tank and an external fuse protecting the same characterized by having sufficient resistance material distributed in good thermal relation to all of the condenser and dielectric material inside the tank to limit the short-circuit current, on even a large-capacity system, to a value which can be safely interrupted by said fuse.

22. A capacitor installation of at least 60,000 volt-ampere capacity comprising a number of parallel paths each of which satisfies the conditions, $$x > .04\ E^{1.5} \text{ and } r > .000,001\ E^2,$$

where $x$ = capacitor impedance of one parallel path, in ohms,
$r$ = resistance of the same path, in ohms, and
$E$ = root-mean-square rated voltage of the capacitor, in volts.

23. A capacitor unit suitable for power-factor correction at commercial power-line frequencies comprising a plurality of parallel paths in a single tank, each of said parallel paths satisfying the conditions, $$r > .000,05\ E^{5/3} \text{ and } x > 3,000\ r\ E^{-1/3},$$

where $x$ = capacitor impedance of one parallel path, in ohms,
$r$ = resistance of the same path, in ohms, and
$E$ = root-mean-square rated voltage of the capacitor, in volts.

24. A capacitor unit suitable for power-factor correction at commercial power-line frequencies comprising a plurality of parallel paths in a single tank, each of said parallel paths satisfying the conditions, $$x > .04\ E^{1.5} \text{ and } r < .0025\ x,$$

where $x$ = capacitor impedance of one parallel path, in ohms,
$r$ = resistance of the same path, in ohms, and
$E$ = root-mean-square rated voltage of the capacitor, in volts.

25. A capacitor unit suitable for power-factor correction at commercial power-line frequencies comprising a plurality of parallel paths in a single tank, each of said parallel paths satisfying the conditions, $$x > .04\ E^{1.5} \text{ and } r < .0019\ x,$$

where $x$ = capacitor impedance of one parallel path, in ohms,
$r$ = resistance of the same path, in ohms, and
$E$ = root-mean-square rated voltage of the capacitor, in volts.

26. A capacitor unit suitable for power-factor correction at commercial power-line frequencies comprising a plurality of parallel paths in a single tank, each of said parallel paths satisfying the conditions, $$.0019\ x > r > .000,002,5\ E^2 \text{ and } x > .04\ E^{1.5},$$

where $x$ = capacitor impedance of one parallel path, in ohms, $r$ = resistance of the same path, in ohms, and $E$ = root-mean-square rated voltage of the capacitor, in volts.

27. A capacitor unit suitable for power-factor correction at commercial power-line frequencies comprising a plurality of parallel paths in a single tank, each of said parallel paths satisfying the conditions, $$.025\ x > r > .000,001\ E^2 \text{ and } x > 0.1\ E^{4/3}$$

where $x$ = capacitor impedance of one parallel path, in ohms, $r$ = resistance of the same path, in ohms, and $E$ = root-mean-square rated voltage of the capacitor, in volts.

28. A capacitor unit suitable for power-factor correction at commercial power-line frequencies comprising a plurality of parallel paths in a single tank, each of said parallel paths satisfying the conditions, $$.0012\ E^{1.6} > r > .000,002\ E^2;\ r < .006\ x;\ \text{and } .2\ E^{1.6} > x > .08\ E^{4/3},$$

where $x$ = capacitor impedance of one parallel path, in ohms, $r$ = resistance of the same path, in ohms, and $E$ = root-mean-square rated voltage of the capacitor, in volts.

29. A capacitor unit suitable for power-factor correction at commercial power-line frequencies comprising a plurality of parallel paths in a single tank, each of said parallel paths satisfying the conditions, $$.006\ x > r > .000,002\ E^2 \text{ and } x > .08\ E^{4/3},$$

where $x$ = capacitor impedance of one parallel path, in ohms, $r$ = resistance of the same path, in ohms, and $E$ = root-mean-square rated voltage of the capacitor, in volts.

30. A capacitor unit suitable for power-factor correction at commercial power-line frequencies comprising a plurality of parallel paths in a single tank, each of said parallel paths satisfying the conditions, $$.004x > r > .000,002\ E^2,$$

where $x$ = capacitor impedance of one parallel path, in ohms, $r$ = resistance of the same path, in ohms, and $E$ = root-mean-square rated voltage of the capacitor, in volts.

31. The invention, as defined in claim 22, characterized by the fact that each of the parallel paths includes a fuse capable of certainly clearing a fault regardless of the short-circuit capacity of the system to which the capacitor may be connected, each capacitor unit comprising a tank containing an impregnating material and a plurality of parallel paths of capacitor-sections, resistors and fuses.

32. The invention, as defined in claim 23, characterized by the fact that each of the parallel paths includes a fuse capable of certainly clearing a fault regardless of the short-circuit capacity of the system to which the capacitor may be connected.

33. The invention, as defined in claim 24, characterized by the fact that each of the parallel paths includes a fuse capable of certainly clearing a fault regardless of the short-circuit capacity of the system to which the capacitor may be connected.

34. The invention, as defined in claim 25, characterized by the fact that each of the parallel paths includes a fuse capable of certainly clearing a fault regardless of the short-circuit capacity of the system to which the capacitor may be connected.

35. The invention, as defined in claim 26, characterized by the fact that each of the parallel paths includes a fuse capable of certainly clearing a fault regardless of the short-circuit capacity of the system to which the capacitor may be connected.

36. The invention, as defined in claim 27, characterized by the fact that each of the parallel paths includes a fuse capable of certainly clearing a fault regardless of the short-circuit capacity of the system to which the capacitor may be connected.

37. The invention, as defined in claim 28, characterized by the fact that each of the parallel paths includes a fuse capable of certainly clearing a fault regardless of the short-circuit capacity of the system to which the capacitor may be connected.

38. The invention, as defined in claim 29, characterized by the fact that each of the parallel paths includes a fuse capable of certainly clearing a fault regardless of the short-circuit capacity of the system to which the capacitor may be connected.

39. The invention, as defined in claim 30, characterized by the fact that each of the parallel paths includes a fuse capable of certainly clearing a fault regardless of the short-circuit capacity of the system to which the capacitor may be connected.

40. A capacitor unit having a plurality of sections in a single impregnating tank substantially filled with insulating impregnating material and having an individual internal resistor in series with each section, characterized by the relations $$.005\ E < r < .006\ x,$$

where $r$ is the resistance of each individual internal resistor and $x$ is the capacitive reactance in series with each individual internal resistor.

41. A capacitor unit suitable for power-factor correction at commercial power-line frequencies and voltages, comprising a plurality of parallel paths in a single impregnating tank substantially filled with insulating impregnating material, each of said parallel paths satisfying the conditions, $$.0001\ E^{1.5} < r < .012\ x,$$

where $x$=capacitive impedance of one parallel path, in ohms, and $r$=resistance of the same path, in ohms.

42. A capacitor unit having a plurality of sections in a single impregnating tank substantially filled with insulating impregnating material and having an individual internal resistor and an individual internal fuse in series with each section of such resistance that the short-circuit current in any section, in case of a fault, does not exceed several hundred amperes, even when said unit is connected to a line of relatively large short-circuit capacity, the number of sections and resistors in parallel in said unit being so large that the total resistor-loss does not exceed several times the capacitor loss.

43. A capacitor unit having a plurality of sections in a single impregnating tank substantially filled with insulating impregnating material and having an individual internal resistor and an individual internal fuse in series with each section characterized by the relations $$.005\ E < r < .006\ x.$$

where $r$ is the resistance of each individual internal resistor and $x$ is the capacitive reactance in series with each individual internal resistor.

44. The invention, as defined in claim 41, characterized by the fact that each of the parallel paths includes a fuse capable of certainly clearing a fault regardless of the short-circuit capacity of the system to which the capacitor may be connected.

45. A capacitor unit suitable for power-factor correction at commercial power-line frequencies and voltages, comprising a plurality of parallel paths in a single impregnating tank substantially filled with insulating impregnating material, each of said parallel paths having an internal individual fuse and resistor capable of limiting the short-circuit watt-seconds to less than 33,000.

46. A capacitor unit suitable for power-factor correction at commercial power-line frequencies and voltages, comprising a plurality of parallel paths in a single impregnating tank substantially filled with insulating impregnating material, each of said parallel paths having an internal individual fuse and resistor capable of limiting the short-circuit watt-seconds to less than 16,000.

47. A capacitor unit suitable for power-factor correction at commercial power-line frequencies and voltages, comprising at least 15 parallel paths in a single impregnating tank substantially filled with insulating impregnating material, each of said parallel paths having an internal individual fuse and resistor capable of limiting the short-circuit watt-seconds to less than 33,000.

48. A capacitor unit suitable for power-factor correction at commercial power-line frequencies and voltages, comprising at least 15 parallel paths in a single impregnating tank substantially filled with insulating impregnating material, each of said parallel paths having an internal individual fuse and resistor capable of limiting the short-circuit watt-seconds to less than 16,000.

49. A capacitor unit suitable for power-factor correction at commercial power-line frequencies and voltages, comprising at least 15 parallel paths in a single impregnating tank substantially filled with insulating impregnating material, each of said parallel paths having a separate internal resistor element in series with one or more capacitor elements and having such ratio between capacitive impedance $x$ and resistance $r$ that $r < .012\ x$.

50. A capacitor unit suitable for power-factor correction at commercial power-line frequencies and voltages, comprising at least 15 parallel paths in a single impregnating tank substantially filled with insulating impregnating material, each of said parallel paths having a fuse and resistor, inside the tank, in series with one or more capacitor elements and having such ratio between capacitive impedance $x$ and resistance $r$ that $r < .012\ x$.

51. A capacitor unit suitable for power-factor correction at commercial power-line frequencies and voltages, comprising a plurality of parallel paths in a single impregnating tank substantially filled with insulating impregnating material, each of said parallel paths having such ratio between resistance $r$ and root-mean-square voltage E that $r$ is not much less than some value of the order of $.000001\ E^2$ and such ratio between capacitive impedance $x$ and resistance $r$ that the total capacitor and resistance loss does not exceed 4.9 watts per KVA of the capacitor rating.

52. A capacitor unit suitable for power-factor correction at commercial power-line frequencies and voltages, comprising a plurality of parallel paths in a single impregnating tank substantially filled with insulating impregnating material, each of said parallel paths having an individual fuse and having such ratio between resistance $r$ and root-mean-square voltage E that $r$ is not much less than some value of the order of .000001 $E^2$ and such ratio between capacitive impedance $x$ and resistance $r$ that the total capacitor and resistance loss does not exceed 4.9 watts per KVA of the capacitor rating.

In testimony whereof, I have hereunto subscribed my name this 23rd day of May, 1929.

RALPH E. MARBURY.